Oct. 13, 1953  L. GESS  2,655,037
FORCE MEASURING INSTRUMENT
Filed Jan. 15, 1946   3 Sheets-Sheet 1

FIG.1

INVENTOR.
LOUIS GESS
BY
E. Wallford Mason
ATTORNEY.

Oct. 13, 1953 — L. GESS — 2,655,037
FORCE MEASURING INSTRUMENT
Filed Jan. 15, 1946 — 3 Sheets-Sheet 2

INVENTOR.
LOUIS GESS
BY
E. Wellford Mason
ATTORNEY.

Oct. 13, 1953 — L. GESS — 2,655,037
FORCE MEASURING INSTRUMENT
Filed Jan. 15, 1946 — 3 Sheets-Sheet 3

INVENTOR.
LOUIS GESS
BY E. Wellford Mason
ATTORNEY.

Patented Oct. 13, 1953

2,655,037

UNITED STATES PATENT OFFICE 2,655,037

FORCE MEASURING INSTRUMENT

Louis Gess, Jenkintown, Pa., assignor, by mesne assignments, to Minneapolis-Honeywell Regulator Company, Minneapolis, Minn., a corporation of Delaware Application January 15, 1946, Serial No. 641,310

4 Claims. (Cl. 73—141)

The general object of the present invention is to provide improved means for measuring forces such as gravitational and dynamometer thrusts. More specifically stated, the general object of the invention is to provide improved means for measuring a force by fluid pressure means comprising a diaphragm against which the force acts in one direction and means for establishing a fluid pressure balancing force acting in the opposite direction.

A specific object of the present invention is to provide force measuring apparatus of the above mentioned general type, including air control apparatus operating to maintain in substantially the same normal or neutral position in stable operation for all values of the force to be measured which the apparatus is adapted to measure.

In preferred practical embodiments of the invention, the required fluid pressure balancing force is maintained by means comprising an air controller of the well known type comprising follow-up and reset, or compensating, mechanisms, and the balancing fluid pressure is measured to thereby obtain an indirect, but accurate and easily made measure of the force to be measured. One commercial form of air controller well adapted for use in the practice of the present invention is of the general type and form disclosed in the Moore Patent 2,125,081, granted July 26, 1938. Any one of various commercial pressure gauges are well adapted for use in measuring the balancing air pressure. In particular that pressure may advantageously be measured by a U-type manometer in some cases, and in other cases may advantageously be measured by a recording pressure gauge including a pen adjusting bellows or Bourdon tube to which the balancing pressure is transmitted.

Heretofore various arrangements have been proposed for measuring a force by means of a diaphragm on which said force acts in one direction and an air controller for automatically subjecting the diaphragm to an opposing fluid pressure balancing force. In all such prior arrangements known to me, however, the air controller employed to maintain the balancing fluid pressure force has been either of the "on and off" type, or of the type which can be called the simple follow-up or throttling type. The use of air controllers of the last mentioned types to regulate the balancing forces acting on the diaphragms of force measuring apparatus of the general character mentioned above, is open to objections which are avoided when my invention is used.

A force measuring device including an air controller of the on and off type is open to the objection that in practically all operating conditions the device has a strong tendency for cyclic or hunting operation, i. e., for such air operation that the balancing air pressure constantly fluctuates between a value slightly higher and a value slightly lower than the precise value required to balance the force to be measured.

Such a tendency to cyclic or hunting operation can be avoided by the use of a force measuring device including an air controller of the simple follow-up type and having a follow-up range suitable for the particular conditions of use. However, an air controller of simple follow-up type, gives regulation with a "drooping characteristic," and when employed to regulate the balancing pressure acting on a force measuring diaphragm, the diaphragm is laterally displaced on each change in the force to be measured to a position which is different from the position occupied by the diaphragm for every other value of said force. Such changes in diaphragm position may prevent accurate measurements in two ways, namely, by distorting the diaphragm and thereby changing the effective area of its flexible portion, and by effecting positional adjustments or changes in the apparatus impressing the thrust force on the diaphragm which is to be measured.

Such adjustment changes are definitely objectionable in certain apparatus creating measuring thrust forces for the measurement of which my invention is of special utility. Thus, for example, my invention is being successfully used with especial advantage in measuring the thrust forces of dynamometers which operate more satisfactorily and efficiently when the thrust is measured by a diaphragm having a fixed normal position than by a diaphragm which occupies definitely different positions for different values of the force measured. In some cases for which my invention is well adapted the diaphragm displacements which would occur if the balancing pressure were maintained by a simple follow-up type air controller, would tend to create objectionable hunting conditions in the dynamometer or other force producing apparatus.

The known type of air controller which I include in my measuring apparatus is free from the hunting or cyclic tendency of the on and off type of controller, because it includes a follow-up mechanism which may be similar in principle and form to the follow-up mechanism employed in a simple follow-up or throttling air controller of commercial form. However, the compensating or reset mechanism of the air controller which I use, prevents the maintenance of the diaphragm in different positions for different values of the measured force, which occurs when the balancing force on the diaphragm is regulated by an air controller which includes a simple follow-up mechanism but does not include associated automatic compensating mechanism.

The various features of novelty which characterize my invention are pointed out with particularity in the claims annexed to and forming a part of this specification. For a better understanding of the invention, however, its advantages, and specific objects attained by its use, reference should be had to the accompanying drawings and descriptive matter in which I have illustrated and described preferred embodiments of the invention.

Figure 1:
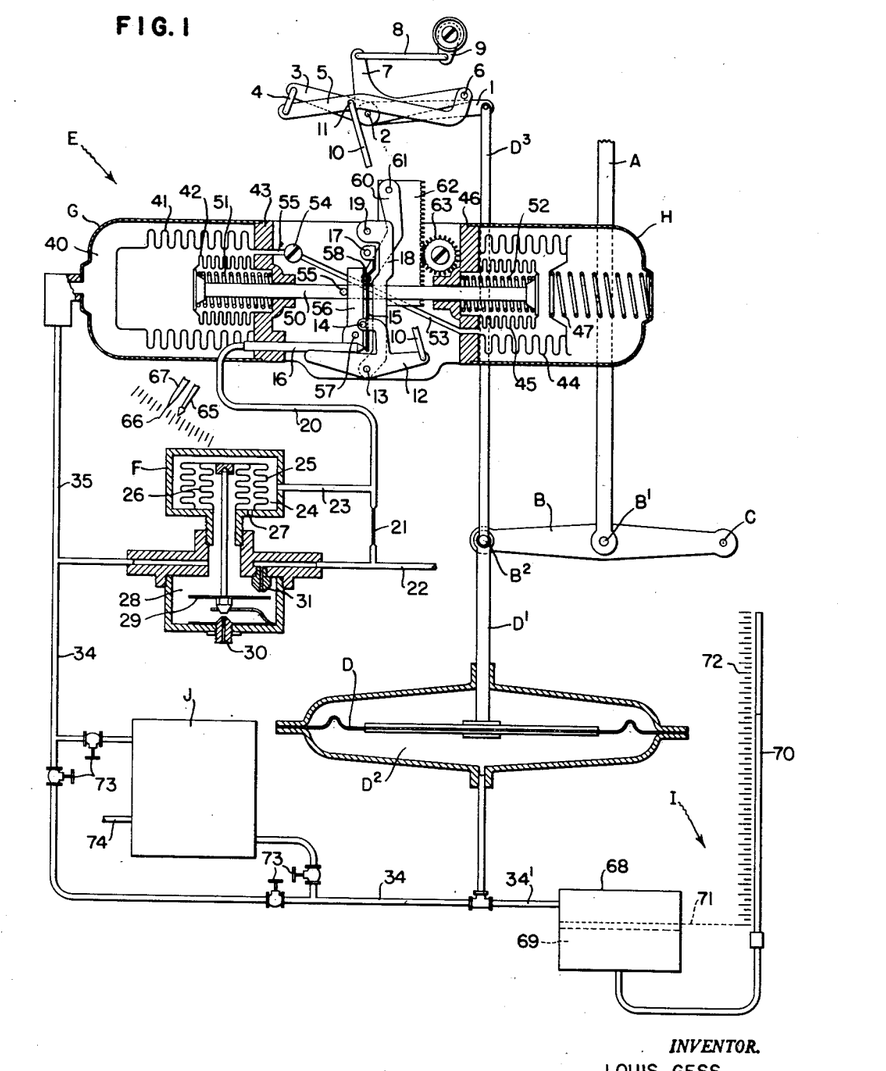
Fig. 1 is a diagrammatic representation of one embodiment of the present invention.

In the embodiment of the invention shown in Fig. 1, the force to be measured is transmitted by a thrust rod or link A to a lever B pivoted on a stationary fulcrum pivot C and pivotally connected at B' to one end of the link A. The lever B is pivotally connected at B² to the stem D' which has one end connected to the center of a flexible diaphragm D which forms the movable wall of a pressure chamber D². As diagrammatically shown, the lever B is a lever of the second class, with its weight arm CB' half the length of its power arm CB². The lever B is shown as extending transversely to the link A and stem D' which are parallel to one another, but the manner in which the thrust of the link A is transmitted to the diaphragm D may be changed as conditions make desirable.

As diagrammatically shown in Fig. 1, an air controller instrument E is actuated by longitudinal movements of the stem D' to increase or decrease an air pressure in the chamber D² as required to return the diaphragm D to a fixed normal or neutral position, when temporarily displaced from that position following an increase or decrease in the force transmitted through the link A, lever B and stem D' to the diaphragm D. The air controller E, diagrammatically shown in Fig. 1, is of known commercial type including follow-up and automatic reset mechanisms. As shown, the stem D' is connected by a link D³ to one arm of a lever element 1 of the instrument E. The lever arm 1 is carried by a shaft 2. A second arm 3 carried by the shaft 2 is connected by a link 4 to one end of a lever 5 which has its other end connected to a fulcrum pivot 6. For most uses of the present invention, the pivot 6 might be maintained in fixed position relative to the framework of the instrument E, but as shown in Fig. 1, the pivot 6 is connected to a so-called control point adjustment mechanism including a lever 7. The latter is pivoted to turn about the axis of the shaft 2. One arm of the lever 7 carries the fulcrum pivot 6, and a second arm of the lever 7 is connected by a link 8 to an arm 9 which can be angularly adjusted to thereby adjust the lever 7 clockwise or counter-clockwise about the axis of the shaft 2.

A link 10 is pivotally connected at one end to the lever 5 at a point 11 which normally is approximately coaxial with the shaft 2. The other end of the link 10 is connected to a lever 12 mounted on a fulcrum pivot 13 and carrying a pin 14. Movement of the pin 14 to the right of its position shown in Fig. 1 moves a flapper valve 15 away from the discharge end of a bleed nozzle 16. As shown, the valve 15 is pivoted at 17 and is biased for clockwise movement into the position in which it prevents air from being discharged by the bleed nozzle 16. The pivot 13 is carried by a lever 18 suspended from a stationary pivot 19. As will be apparent, the pin 14 is given movements to the right or left by clockwise or counter-clockwise turning movements of the lever 12 about the pivot 13, and also by the counter-clockwise and clockwise movements, respectively, of the lever 18 about its pivot 19. Turning movements of the lever 18 are produced by the follow-up and reset mechanisms of the air controller as is hereinafter explained.

As shown in Fig. 1, the bleed nozzle 16 is connected through a pipe 20 and restricted orifice 21 to a pipe 22 provided to supply air at a suitable and approximately constant pressure. The pressure in the pipe 20 will vary from a maximum approximating the pressure in the pipe 22 to a minimum approximating the pressure of the atmosphere as the flapper valve 15 is moved away from a position in which it engages the bleed nozzle 16 and substantially prevents air from being discharged to the atmosphere through the nozzle. The extent of flapper movement relative to the nozzle 16 required for the full bleed nozzle pressure change is quite small, usually of the order of four thousandths of an inch.

The varying air pressure in the pipe 20 is transmitted through a pipe 23 to the low pressure chamber 24 of a pilot valve or relay F. The chamber 24 has a movable wall formed by a bellows 25. The lower end of the bellows 25 is stationary but its upper end is movable. The tendency of the pressure in the chamber 24 to collapse or shorten the bellows 25 is opposed, and normally is balanced by the pressure within a smaller bellows 26. The latter is coaxial with the bellows 25 and has a movable upper end connected to the movable upper end of the bellows 24. The lower end of the bellows 26 is fixed and the space between the two bellows is open to the atmosphere through a passage 27. The space within the bellows 26 communicates with a valve chamber 28 including a valve member 29 given up and down movements by the up and down movements of the connected upper ends of the bellows elements 25 and 26. The up and down movements of the valve 29 respectively decrease and increase the pressure in the chamber 28 by respectively opening a vent port 30 to the atmosphere and throttling or closing an inlet port 31 through which air passes into the chamber from the pipe 22.

The pressure in the chamber 28 is transmitted to the diaphragm chamber $D^2$ by a pipe 34, and is transmitted by a pipe 35 to the control pressure chamber 40 of the follow-up mechanism unit G of the instrument E. The unit G is coaxial with an associated automatic reset mechanism unit H. As shown, the units G and H are coaxially spaced apart sections of a unitary structure, in which the lever 12, flapper valve 15, lever 18 and other parts hereinafter mentioned are mounted in the space between said units. The chamber 40 has a rigid outer wall and an inner wall formed by a bellows 41. Within the bellows 41 is a smaller coaxial bellows 42. The unit G comprises a rigid stationary end wall part 43 to which the adjacent ends of the bellows elements 41 and 42 are connected. The other end of each of the bellows elements 41 and 42 is closed and movable.

The reset mechanism unit H comprises coaxial large and small bellows elements 44 and 45 respectively, and is structurally like the unit G except in respect to the means for applying a collapsing force to the bellows 44. Each of the bellows elements 44 and 45 has its end at the end of the unit adjacent the wall part 43 of the unit G, secured to a wall part 46 similar to the wall part 43, and at the opposite side of the flapper valve 15. The bellows 45 may be a counter part of the bellows 42, but the bellows 44 may, and as shown does comprise fewer convolutions than the bellows 41. The unit H does not include a pressure chamber like the chamber 40, but has the bellows 44 externally exposed to the pressure of the atmosphere and to the collapsing action of a compression spring 47. The latter acts between the closed movable end of the bellows 44 and a shell or casing which surrounds the bellows 44 and spring 47 and is formed with one or more air inlet openings.

The movable ends of the smaller bellows elements 42 and 45 of the units G and H are connected by a rod or bar 50 which is coaxial with said bellows elements, and has its ends rigidly connected to their movable ends. Openings are formed in the wall parts 43 and 46 to permit free longitudinal movements of the bar 50 and to permit the maintenance of atmospheric pressure within the bellows elements 42 and 45 at all times. A spring 51 acts between the wall part 43 and the closed end of the bellows 42 and opposes the contraction of the latter. Similarly a spring 52 acts between the wall part 46 and the closed end of bellows 45 and opposes the contraction of the latter. The inter-bellows spaces of the units G and H are closed except for a commensurating connection formed by a conduit 53. The latter forms a restricted path of flow through which fluid passes slowly from the inter-bellows space of the unit G into the inter-bellows space of the unit H when the pressure in the chamber 40 is increased, and through which pressure fluid flows slowly in the reverse direction when the pressure in the chamber 40 is reduced. The flow through the channel 53 may be variably restricted to regulate the reset rate by the adjustment of a throttling element 54 which may be a needle valve. The fluid in the inter-bellows spaces of the units G and H is commonly an oil or other suitable liquid.

The lever 18 is biased to turn about its supporting pivot 19 in the clockwise direction and to move the flapper actuating pin 14 to the right or the left, when the rod 50 moves to the right or to the left. The amount of movement given to the lever 18 and pin 14 by a given longitudinal adjustment of the rod 50 is subject to adjustment, and is effected by means comprising a transverse projection 55 from the rod 50, a lever 56 pivoted at 57 and having one side engaged by the projection 55, and a thrust pin 58 acting between the levers 56 and 18. The leverage with which the lever 56 operates through the pin 58 on the lever 18, can be varied by adjustment of the pin 58 longitudinally of the two levers, each of which extends transversely to the bar 50. To effect such adjustments the pin 58 is carried by an arm 60 pivoted at 61 to a rack bar 62 which extends transversely to the bar 50 and is adjustable in the direction of its length by the rotation of a spur gear 63 in mesh with the teeth of the rack bar 62.

As those familiar with the art will understand, on an increase in the force transmitted to the diaphragm D through the link A, lever B and stem D', the lever 3 is turned clockwise. When so moved, the lever 3 acts through the link 10 to turn the lever 12 counter-clockwise and thereby move the pin 14 to the left. This permits the flapper 15 to approach the bleed nozzle 16 and thereby increase the pressure transmitted through the pipe 23 to the chamber 24 of the pilot valve F. The resultant adjustment of the pilot valve member 29 effects an increase in the pressure in the valve chamber 28 which is transmitted by the pipes 34 and 35 to the diaphragm chamber $D^2$, and to the pressure chamber 40 of the follow-up unit G. The pressure increase in the chamber 40 shortens the bellows element 41 and correspondingly shortens the bellows element 42, since the inter-bellows space is filled with non-compressible liquid. The extent to which the bellows 42 is thus shortened by a pressure increase in the chamber 40 is that required to effect an equal increase in the aggregate spring force opposing the contraction of the bellows element 41 and 42. Aside from the resiliency of the walls of the various bellows elements, said aggregate spring force is the result of the spring forces of the springs 47, 51 and 52. When the bellows 42 is being contracted the springs 47 and 51 each oppose the contraction with a force increasing as the bellows is shortened. The spring 52 then acts in the direction to contract the bellows 42 with a force which diminishes as the contraction of the bellows 42 increases. When the pressure in the chamber 40 is reduced the rod moves to the left until the resultant of the spring forces acting on the bellows 42 is correspondingly reduced.

The movement to the right given the pin 14 on a pressure increase in the pressure chamber 40, results in a movement of the rod 50 to the right and a movement of the flapper valve 15 away from the nozzle 16. The last mentioned movement is a follow-up adjustment which eliminates more or less of the pressure increase produced by the preceding or initial movement of the pin 14 to the left. The relative magnitudes of the initial movement of the pin 14 in one direction and the resultant follow-up movement of the pin in the opposite direction, depend upon and constitute a measure of the throttling range of the air controller instrument E. The term "throttling range," as the expression is used herein in connection with Fig. 1, means the magnitude of the controller adjustment effected by the link $D^3$, which is required to change the air pressure in the bleed nozzle 16 from its minimum value to its maximum value. The adjustment of the pin 58 to increase or decrease the extent of follow-up movement of the pin 14 in one direction produced by a given movement of the rod 50 in the same direction, respectively increases or decreases the throttling range and thereby increases or decreases the displacement of the diaphragm D from its normal position, which would be produced by a given change in the force transmitted to the diaphragm through the link or thrust rod A, if the air controller E included no reset mechanism. The tendency of the follow-up mechanism G, if not associated with the reset mechanism H, would be to continuously maintain a magnitude of displacement of the diaphragm D from its neutral position proportional to the force transmitted to the diaphragm by the rod A.

The purpose and tendency of the reset mechanism of the instrument E is to slowly and gradually reduce to zero any existing displacement of the diaphragm from its neutral position. The operative effect or result of the slow flow of fluid through the channel 53 between the inter-bellows spaces of the units G and H is to restore the small bellows elements 42 and 45 to their normal lengths following a change in the pressure in the chamber 40 which has elongated one and shortened the other of those elements.

Merely by way of illustration and example, and not by way of limitation, it is noted that in one practical embodiment of the type and form of the invention shown in Fig. 1, adapted to measure a force transmitted by the thrust rod A as great as six thousand pounds, the air pressure supplied by the pipe 22 is fifteen pounds, the pressure of the air in the bleed nozzle 16 may vary from a minimum of a fraction of a pound to a maximum of approximately fifteen pounds, as the flapper valve 15 is moved away from a position in contact with the nozzle 16 for a distance of four thousandths of an inch. In that embodiment the apparatus is so proportioned and calibrated that an instantaneous change of thirty pounds in the thrust transmitted by the rod A produces a displacement of the diaphragm D to an extent sufficient to give the flapper valve a movement of two thousandths of an inch toward or away from the nozzle. In such case, as those skilled in the art will understand, each movement of the flapper valve 15 resulting from a substantially instantaneous change in the force transmitted by the thrust rod A must be promptly followed by a follow-up adjustment of the flapper valve which eliminates approximately 99 per cent of said initial flapper adjustment. Thus on the assumptions made above, an instantaneous change of thirty pounds in the force transmitted by the rod A would result in the initial flapper adjustment of .002", and the return or follow-up adjustment of the flapper would amount to .00198".

In Fig. 1 an exhibiting arm 65 which customarily is rigidly connected to the shaft 2 is adapted to indicate on a scale 66 the displacement of the diaphragm D from its neutral position. That position may be indicated on the scale 66 by a neutral position mark or as shown in Fig. 1, by a so-called control pointer 67 attached to the lever 7 to oscillate about the axis of the shaft 2 as the lever 7 is adjusted by the adjusting arm 9. The actual effect of the adjustment of the arm 9 of the apparatus shown in Fig. 1 is to raise or lower the level of the diaphragm D when in its neutral position. Such diaphragm level adjustment is ordinarily unnecessary. In consequence, there is ordinarily no real occasion for the inclusion of control point adjustment provisions in the apparatus shown in Fig. 1, other than that the controller E may well be a commercial device useful for other purposes in which control point adjustment is desirable. In such case the deviation of the pointer 65 in one direction or the other from its neutral position indicates that the diaphragm is temporarily above or below its normal level. In general, such deflection indicates the occurrence of a change in the magnitude of the force transmitted to the diaphragm D through the rod A and the direction of that change, but does not definitely show the actual or approximate magnitude of said force. When a record of the variations in the force is desired, the scale 66 may be formed on a movable record chart and the arm 65 may then be a pen arm which makes a record curve on the chart. That chart will show the frequency and direction of the changes in the force measured, and may give some general indication of the relative magnitudes of successive changes.

With the apparatus shown in Fig. 1, an accurate measurement of the force transmitted to the diaphragm D through the link A is obtainable by a pressure gauge measurement of the balancing air pressure in the chamber $D^2$. In Fig. 1 that measure is obtained by means of a U-tube manometer I, shown as comprising a leg 68 of relatively large horizontal cross-section partially filled with mercury 69, with a pipe connection 34' transmitting the air pressure in the chamber $D^2$ to the air space above the mercury 69 in the leg 68. The second leg 70 of the manometer I is vertically elongated and much smaller in horizontal cross-section than the leg 68. If the line 71 represents the common level of the mercury in the leg 68 and 70 when no force is transmitted to the diaphragm D through the link A, then the actual magnitude of any force transmitted to the diaphragm to the rod may be directly indicated in pounds or other suitable units on a scale 72 alongside the leg 70 with the lower or zero end of the scale at the level 71.

In air controllers of the general character of the controller E, the air pressure supplied by the pipe 22 is quite customarily of the order of fifteen or twenty pounds. In some cases it may be practically desirable to be able to maintain a higher pressure in the chamber $D^2$ when the maximum force to be measured is being transmitted to the diaphragm D. In such case I may connect a relay or booster valve J in the pipe 34. As diagrammatically shown in Fig. 1, the valve J may be connected into and disconnected from the pipe 34 by opening and closing appropriate shut-off valves 73. The relay or booster valve J may be a replica of the pilot valve F. In such case the pipe 34 will be connected to the valve J as the pipe 23 is connected to the valve F, and air under a pressure suitably higher than the pressure supplied by the pipe 22 may be supplied to the valve J through a pipe 74, as air is directly supplied to the valve F through the pipe 22. In one practical embodiment of apparatus of the general type and form shown in Fig. 1 the pipe 22 supplies air at a pressure of fifteen pounds and the pipe 74 supplies air at a pressure of thirty pounds, and the pressure in the chamber $D^2$ may be varied from approximately zero at a low value of the force to be measured, up to sixty pounds when the measuring force obtains the maximum value which the apparatus is adapted to measure.

Figure 2:
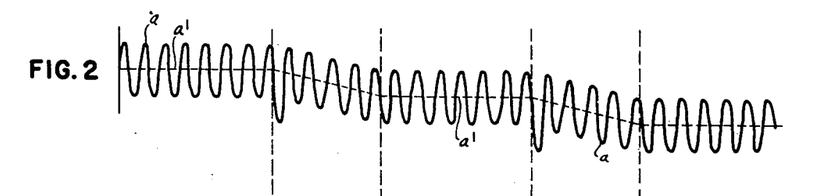
Fig. 2 is a curve showing the type of diaphragm movements resulting from changes in the force measured by the apparatus shown in Fig. 1.
Figure 2A:
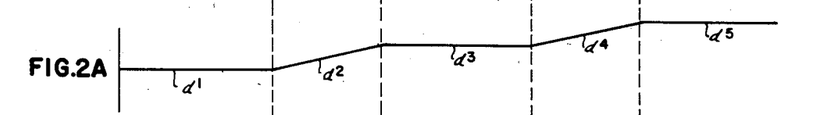
Fig. 2A is a curve illustrating assumed changes in the value of the measured force.
Figure 3:
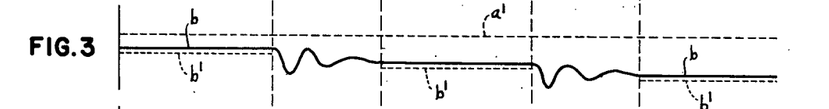
Fig. 3 is a curve showing the type of diaphragm displacements which would result from changes in the force measured by the apparatus shown in Fig. 1, if its reset mechanism were omitted.
Figure 4:
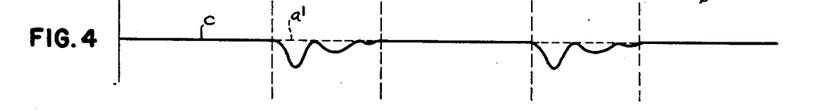
Fig. 4 is a curve showing the type of diaphragm movements which would result from changes in the force measured with the apparatus shown in Fig. 1, if both follow-up and its reset mechanisms were omitted.

The characteristic operative effects of the inclusion of the follow-up and reset mechanisms of Fig. 1 are made apparent by comparison of the diaphragm position curves $a$, $b$ and $c$ shown in Figs. 2, 3 and 4, respectively. Each of those curves illustrates changes in the position of a diaphragm D controlled by an air controller of one or another of three different types during five successive periods in which the force to be measured has different values shown by way of example in Fig. 2A by a curve comprising sections $d'$, $d^2$, $d^3$, $d^4$ and $d^5$. Thus, in Fig. 2A it is assumed that during an initial stable operation period, the force has a constant value represented by the horizontal line $d'$; that during a second period the value of the force measured progressively increases as represented by the inclined line $d^2$; that during a third period the value of the force measured has a constant value represented by the horizontal line $d^3$ and greater than the value represented by the line $d'$; that during a fourth period the value of the force progressively increases as indicated by the inclined line $d^4$; and that during the fifth period the force measured has a constant value represented by the horizontal line $d^5$.

Fig. 2 illustrates diaphragm movements occurring when the balancing air pressure is controlled by a typical on and off controller such as would be formed out of the Fig. 1 instrument E, if its follow-up and reset mechanism of Fig. 1 were omitted, or rendered inoperative as by the closure of pipe 35. In the normal and to be expected operation of such apparatus, the diaphragm D will oscillate generally as indicated by the curve $a$ of Fig. 2, between positions respectively above and below the dotted line $a'$ which represents the normal or neutral position of the diaphragm. Ordinarily, the oscillation of the diaphragm will be of about the same amplitude and frequency with the force measured steady at any of the different values represented by the horizontal lines $d'$, $d^3$ and $d^5$. During the periods in which the force measured is varying as indicated by lines $d^2$ and $d^4$ the magnitude and frequency of the undulations of the curve $a$ may change somewhat.

In Fig. 3 the curve $b$ represents the character of the changes in position of the diaphragm D which may be expected to occur when the measured force has different values represented by the curve $d'$, $d^2$, $d^3$, $d^4$ and $d^5$ shown in Fig. 2A, when the Fig. 1 control apparatus has its follow-up mechanism G operative, but lacks the reset mechanism H, or has the latter rendered inoperative as by a closure of the passage 53. With the control apparatus in such condition, on the changes in value of the measured force indicated in Fig. 2A, the position of the diaphragm D will stabilize at three different levels represented by the different straight line sections of the curve $b$ located at progressively greater distances below the normal or neutral diaphragm level indicated by the dotted line $a'$, during the successive periods in which the measured force values are respectively represented by the curve sections $d'$, $d^3$ and $d^5$ of Fig. 2A. During the periods in which the measured force is changing as indicated by the Fig. 2A curve sections $d^2$ and $d^4$, the curve $b$ will have an undulatory form with its undulations damped out, generally as shown in Fig. 3, as stable operation is attained following each change in the measuring force.

The curve $c$ of Fig. 4 is a typical representation of the changes in the position of the diaphragm $d$, which will occur when the position of the diaphragm is controlled by the Fig. 1 apparatus, with its follow-up and reset mechanisms both operating. The curve $c$ of Fig. 4 is like the curve $b$ of Fig. 3, in that it includes three successive horizontal sections with an undulatory section between each two horizontal sections. The curve $c$ differs radically from the curve $b$, however, in that the different horizontal sections of the curve $c$ are all substantially at the normal or neutral level indicated by the dotted line $a'$. Inasmuch as the reset mechanism tends continuously to restore the small bellows elements 43 and 45 to their normal positions when displaced from those positions the oscillation amplitude of the undulatory portions of the curve of Fig. 4, should be slightly smaller than those of the curve $b$ of Fig. 3.

Theoretically, the intermediate horizontal section of the curve $c$ must be lower than the initial horizontal section and higher than the final horizontal section, but the difference in the levels of the three sections is too small to have practical significance. As those skilled in the art will recognize, as the force measured progressively increases from zero to its maximum value, the flapper valve 15 must move toward the nozzle 16 the 0.004" or so required to vary the pressure in the nozzle 16 between its maximum values. To effect such an amount of flapper movement, the displacement of the diaphragm D required may well be of the order of .001" or so. On the assumptions that a thirty pound variation in the force measured will effect a flapper valve movement of 0.002" and that with an air controller having follow-up and reset mechanisms, the diaphragm position will be .001" lower when the force measured is six thousand pounds than when that force is approximately zero. When the balancing pressure is controlled by a simple follow-up air controller as contemplated in Fig. 3, the diaphragm will be depressed at least two inches below its normal level by a force to be measured of six thousand pounds. Moreover, the maximum diaphragm displacement may then be greater than two inches as a result of diaphragm distortion.

The usual effect of a substantial displacement of a diaphragm like diaphragm D is to so distort the diaphragm as to change its effective area, i. e., its area free to move in response to changes in the pressure differential acting on the diaphragm. Such changes in its effective area changes the diaphragm depression produced by a given pressure differential and changes the air pressure which in use act on the inner side of the diaphragm to balance the force measured. Changes in diaphragm displacement and balancing force due to diaphragm distortion are indicated in Fig. 3 by the dotted line portions curve $b'$ below the horizontal portions of the full-line curve $b$.

Any considerable distortion of the diaphragm D is objectionable because it increases the stresses to which the diaphragm is subject and thereby increases the risk of diaphragm failure and shortens the normal life of the diaphragm.

The reduction in the effective area of the diaphragm contributes directly to measuring inaccuracy, since it reduces the ratio between the balancing pressure per square inch and the weight to be measured.

The apparatus shown in Fig. 1 has been successfully used in measuring dynamometer thrust and analogous forces of thousands of pounds for purposes previously served by the use of weight measuring scales or balances, originally of the beam and sliding weight type, but later of the spring balancing type. While the use of spring balanced type of weighing scales was generally recognized as undesirable for some reason, the inherent self-balancing capacity of that type of scale was regarded as sufficiently advantageous in comparison with the manual, or complicated automatic, rebalancing means of the beam and sliding weight type of scale, to justify the adoption of the spring balanced type of scale for uses now served by apparatus of the type and form shown in Fig. 1.

Figure 5:
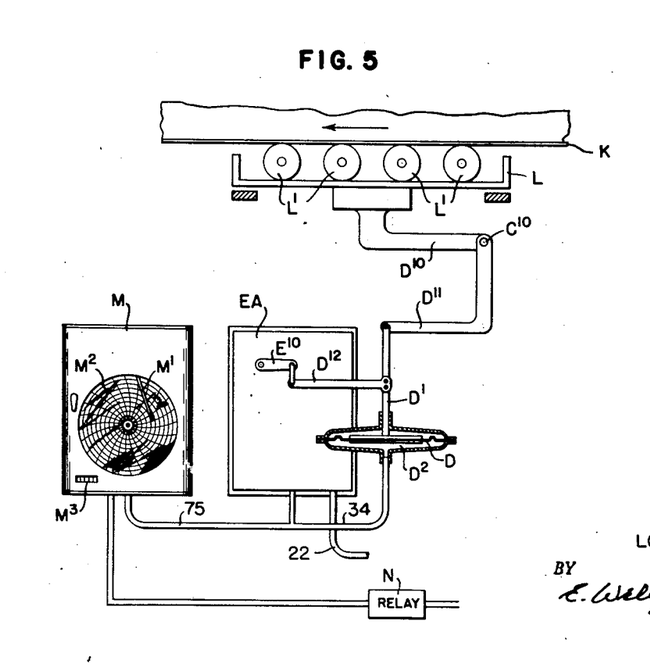
Figs. 5, 6 and 7 are diagrammatic representations of embodiments of the present invention differing from one another and from the embodiment shown in Fig. 1.
Figures 6, 7:
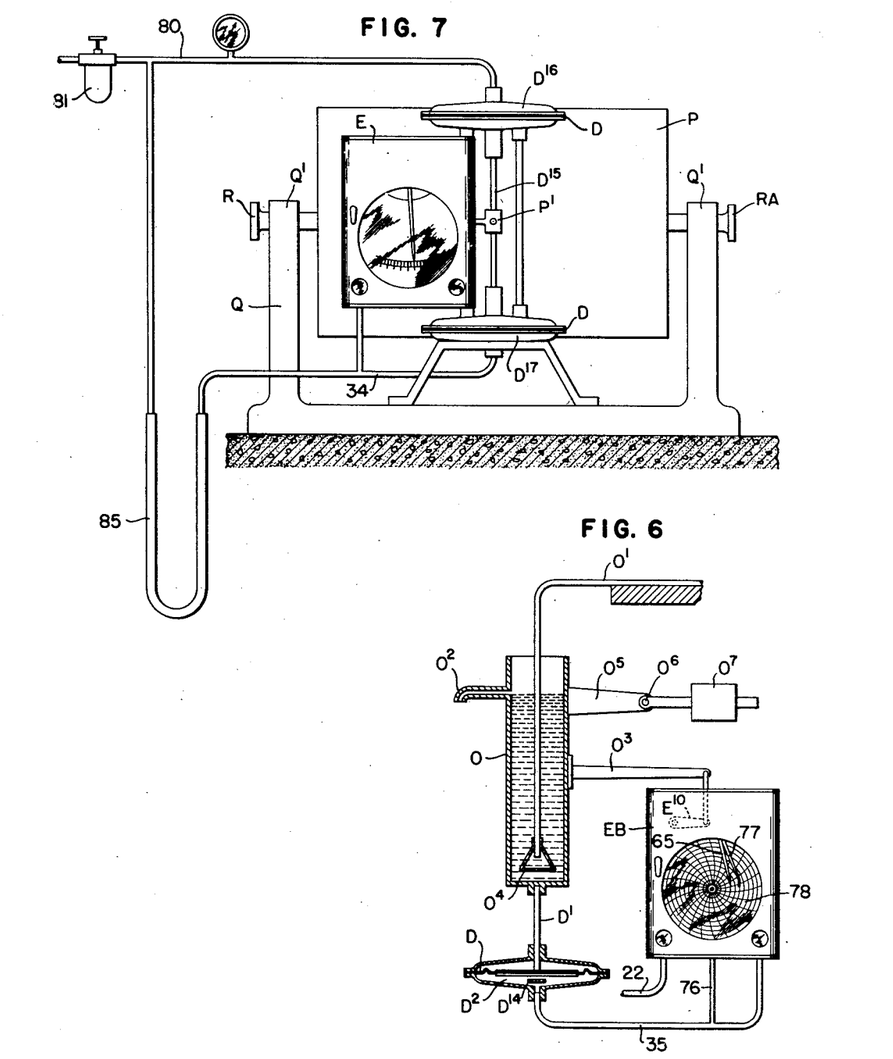

The general principles of the present invention may be embodied in apparatus differing widely in form from that shown in Fig. 1, and by way of illustration and example, I have diagrammatically shown three different embodiments in Figs. 5, 6 and 7. The embodiment of the invention shown in Fig. 5 is primarily devised for use in continuously weighing material while it is supported on a travelling conveyor belt K. As diagrammatically shown in Fig. 5, the conveyor moves in the direction of the arrow over a weighing platform L on which are mounted anti-friction rollers L' which engage and directly support the portion of the conveyor belt K above the platform L. The weight of the platform L and its load is transmitted through a lever pivoted at $C^{10}$, and comprising arms $D^{10}$ and $D^{11}$, to the stem D' of the diaphragm D which form the movable top wall of the pressure chamber $D^2$ of a balancing device similar in form and arrangement to the balancing device of Fig. 1. As shown, an arm $D^{12}$ carried by the stem D' is arranged to actuate a control lever $E^{10}$ mounted on the back wall of a control instrument EA. The latter may be identical with the instrument E' of Fig. 1, except for the manner in which movement of the diaphragm D is transmitted through the arm $D^{12}$ and lever $E^{10}$ to the lever of the instrument EA which corresponds to the lever I of Fig. 1.

As shown in Fig. 5, the balancing pressure transmitted to the diaphragm chamber $D^2$ through the pipe 34 from the instrument EA, is also transmitted through the pipe 75 to a pressure recording instrument M including a pen M' for recording the varying value of the balancing pressure on a recording chart $M^2$. In many cases, the instrument M may advantageously include a motor driven mechanical integrating mechanism for actuating counting wheels $M^3$ adapted to totalize and exhibit the aggregate weight of the material on the conveyor K moving over the weighing platform L during an extended period of operation. The pressure integrating and recording mechanisms of the instrument M may be of various known types, and their specific arrangement and construction form no part of the present invention and need not be further referred to herein. It is noted, however, that a relay or control device N may advantageously be employed to manually or automatically interrupt the supply of energizing current to the electric motor driving the integrating mechanism of the instrument M when the operation of that motor becomes unnecessary as a result of the interruption of the travel over the platform L of material to be weighed.

As will be apparent, the apparatus shown in Fig. 5 is adapted to weigh batches of material dumped on the platform L, or in a bin or other receptacle supported by the platform. As will be apparent, also, the controlled air pressure maintained in the chamber $D^2$ of Fig. 5 may be transmitted, when desirable, to means for regulating the rate at which material is passed on to the conveyor L.

In Fig. 6, I have illustrated an embodiment of the invention specifically adapted for continuously determining the specific gravity of acid or other liquid supplied to a vertically movable tank O through a stationary pipe O', said tank having an overflow outlet $O^2$ through which liquid is discharged at the same rate at which the tank receives liquid through the pipe O'. As shown, the tank O is directly supported by the coaxial stem D' of a diaphragm D which forms the top wall of a balancing pressure chamber $D^2$, as in the construction shown in Figs. 1 and 5. The tank O has a lateral arm $O^3$ for actuating the air controller which is included in an instrument EB and which may be exactly like the air controller of Fig. 1. The air controller lever of the instrument EB, corresponding to the lever I of Fig. 1, may be actuated by the arm $O^3$ through a lever $E^{10}$ as in the instrument EA of Fig. 5.

To dissipate the velocity head of the liquid passing into the tank O through the pipe O', the latter is shown as supporting a horizontally extending baffle $O^4$ within and adjacent the lower end of the tank O and located at a level somewhat below the lower depending end of the pipe O'. The purpose of the baffle $O^4$ is to receive the impact of the down flowing liquid and to dissipate most of the velocity head of the down-flowing liquid, which would otherwise impact against the lower end of the tank O. In the preferred construction shown in Fig. 6, the tank O is provided with a lateral arm $O^5$ journalled on a horizontal pivot $O^6$ and carrying a counterweight $O^7$. The latter forms a means for counter-balancing the weight of the tank O and parts attached thereto, and for neutralizing any velocity head effect on the tank O which the baffle $O^4$ does not eliminate, so that the weight actually rebalanced by the air pressure in the chamber $D^2$ may be substantially nothing but only the weight of the liquid in the tank O.

Advantageously, and as shown, the instrument EB includes pressure recording mechanism through which the pressure transmitted to said mechanism from the pipe 35 through the branch pipe 76, is recorded on a rotary chart 78 by a recording pen 77. As the pressure recording mechanism of the instrument EB for actuating the pen 77, may be of any one of various known commercial types, further illustration or description of that mechanism is unnecessary herein. The instrument EB includes an indicator arm 65 which shows by its movement relative to the chart 78, the momentary variations in the position of the diaphragm D resulting from relatively sudden and appreciable changes in the density of the liquid passing through the tank O.

When the instrument EB includes an adjustable control point index 67, the latter may advantageously be set in a position in which it indicates the normal or desired value of the specific gravity of the liquid passing through the tank O. That value may well be 1. in some cases, but must be different in other cases, as for example, in the case of 87% sulphuric acid which has a specific gravity of 1.8. With the control point index 67 set at the normal specific gravity value the deflection of the indicator 65 out of register with the index 67, provides a direct visual indication of the fact that the actual specific gravity of the liquid exceeds or is less than is desired. To protect the diaphragm against injury due to excessive down movement of the tank O, which otherwise might accidentally occur occasionally, a stationary stop D¹⁴ is provided in the chamber D² of Fig. 6.

In Fig. 7, I have illustrated another dynamometer arrangement comprising a dynamometer body P pivotally supported by aligned hollow gudgeon portions Q' of a frame Q. A flanged shaft member R extends through one of the hollow gudgeons and a second flanged shaft RA extending through the other hollow gudgeon. Each shaft may be connected to a power absorbing mechanism mounted in the body P. The body P is thus subjected to a torque which is a measure of the power absorbed, and tends to turn said body P about the common axis of its supporting gudgeons. This torque is transmitted by a torque arm P' to the common stem D¹⁵ of an opposed pair of pressure balancing devices D¹⁶ and D¹⁷. Each of said devices includes a diaphragm D and a pressure chamber D², as do the previously mentioned pressure balancing devices.

In the arrangement shown, a constant air pressure is transmitted through a pipe 80 from a pressure regulator 81 to the pressure chamber D² above the diaphragm D of the device D¹⁶. An air controller E which may be exactly like the instrument E of Fig. 1, supplies air under the required balancing pressure to the pressure chamber D² below the diaphragm D of the device D¹⁷. As shown diagrammatically, the differential of the pressure transmitted to the device D¹⁷ from the instrument E through the pipe 34, and the pressure transmitted to the device D¹⁶ by the pipe 80, is measured by a U-tube manometer 85.

As will be apparent, the pressure transmitted from the instrument E to the device D¹⁷ will necessarily exceed the pressure transmitted to the device D¹⁶ through the pipe 80 when the dynamometer torque is in the direction to move the torque arm P' downward. When the dynamometer torque tends to move the torque arm P' upward, the balancing pressure in the device D¹⁷ is necessarily less than the pressure supplied to the device D¹⁶ through the pipe 80. This arrangement makes it readily possible, for example, to use the dynamometer in measuring the power developed by an engine when the latter rotates the flanged shaft R and creates the torque and gives the arm a tendency to down movement, when and for use in determining the engine friction when the engine is rotated by a motor connected to the flanged shaft RA and rotating the latter in the direction tending to give an upward movement to the free end of the torque arm P'.

In the use of the present invention under different conditions a considerable variation in throttling range is needed. In using the invention in connection with a dynamometer it has been found that a rather wide throttling range is ordinarily required. For example, in measuring the thrust of an airplane engine it has been found that ordinarily the throttling range should be such that the reset mechanism will eventually eliminate about eighty per cent of each follow-up adjustment of the air controller when after a change resulting in a follow-up adjustment, the force remains steady until the automatic reset mechanism substantially eliminates the follow-up adjustment. In general, unless a suitably wide throttling range exists in controlling a dynamometer, the pressure balancing diaphragm and the balancing pressure will inevitably hunt or cycle. However, different operating conditions require somewhat different throttling ranges to avoid hunting operation of the air controller.

Quite aside from its effect on the diaphragm position and on the air pressure which provides a measure of the dynamometer thrust, fluctuations of the balancing diaphragm and air pressure may cause the dynamometer mechanism to hunt. Moreover, as previously noted, substantially better results are ordinarily obtained with a dynamometer having substantially no torque arm movement than with a dynamometer having the extent of torque arm movement required with the balancing pressure against a diaphragm controlled by an ordinary air controller having a follow-up mechanism but no automatic compensating mechanism.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. Force measuring apparatus comprising in combination a balancing device having a pressure chamber and a flexible diaphragm forming a movable wall of said chamber, means for applying to said diaphragm a force whose variations are to be measured, air controller means for maintaining a fluid pressure in said chamber which normally holds said diaphragm in a substantially constant normal position notwithstanding variations in said force acting against the other side of said diaphragm, and including automatic follow-up and reset mechanisms and an adjustable bleed valve, means responsive to movements of said diaphragm and cooperating with said follow-up and reset mechanisms to regulate the adjustment of said bleed valve, and means for measuring the fluid pressure in said pressure chamber.

2. Force measuring apparatus comprising in combination a pair of balancing devices each having a pressure chamber and a flexible diaphragm forming a movable wall of said chamber, a force transmitting connection to the two diaphragms operable to move one diaphragm in the direction to contract or expand the corresponding pressure chamber while simultaneously moving the second diaphragm in the direction to respectively expand or contract the other pressure chamber, means for maintaining a substantially constant fluid pressure in one of said chambers, air controller means for maintaining a fluid pressure in the second of said chambers varying as required to normally maintain the corresponding diaphragm in a substantially constant position notwithstanding variations in the magnitude and direction of force transmitted to said diaphragm by said connection, said controller means including a bleed valve and automatic follow-up and reset mechanisms, means responsive to movements of said second diaphragm and cooperating with said follow-up and reset mechanisms to jointly regulate the adjustment of said bleed valve, and means for measuring the fluid pressure in said second chamber.

3. Force measuring apparatus comprising in combination, a stem mounted for straight line motion parallel to and actuated by a force whose variations are to be measured and are independent of the action of said apparatus, a balancing device having a pressure chamber and a flexible diaphragm forming a movable wall of said chamber and connected to said stem so as to be moved thereby, air controller means for maintaining a fluid pressure in said chamber which normally holds said diaphragm and said stem in a substantially constant normal position notwithstanding variations in said force acting against said stem and said diaphragm in the direction opposite to said pressure, said air controller means including automatic follow-up and reset mechanisms and an adjustable bleed valve, means responsive to movements of said stem and of said diaphragm and cooperating with said follow-up and reset mechanisms to regulate the adjustment of said bleed valve, and means for measuring the fluid pressure in said pressure chamber.

4. Apparatus for measuring forces such as gravitational and dyamometer thrusts and comprising in combination, a thrust rod mounted for straight line movement in response to variations in the force whose variations are to be measured and are independent of the action of said apparatus, a lever having a stationary pivot and a pivotal connection with said rod, a stem having pivotal connection with said lever and mounted for straight line movement parallel to said rod, a balancing device having a pressure chamber and a flexible diaphragm connected to said stem and forming a movable wall of said chamber, air controller means for maintaining a fluid pressure in said chamber which normally holds said diaphragm and said stem in substantially constant normal position notwithstanding variations in said force acting in the opposite direction on said rod and said stem and said diaphragm, said air controller means including automatic follow-up and reset mechanisms and an adjustable bleed valve, means responsive to movements of said stem and of said diaphragm and cooperating with said follow-up and reset mechanisms to regulate the adjustment of said bleed valve, and means for measuring the fluid in said pressure chamber.

LOUIS GESS.

References Cited in the file of this patent

UNITED STATES PATENTS

| Number | Name | Date |
|---|---|---|
| 2,013,810 | Shimek | Sept. 10, 1935 |
| 2,125,081 | Moore | July 26, 1938 |
| 2,248,322 | Annin | July 8, 1941 |
| 2,309,415 | Pearson et al. | Jan. 26, 1943 |
| 2,314,178 | Tate | Mar. 16, 1943 |
| 2,342,696 | Rover | Feb. 29, 1944 |
| 2,354,423 | Rosenberger | July 25, 1944 |
| 2,427,235 | Smoot | Sept. 9, 1947 |